US 6,616,569 B2

(12) United States Patent
Hoang et al.

(10) Patent No.: US 6,616,569 B2
(45) Date of Patent: Sep. 9, 2003

(54) TORQUE CONTROL SYSTEM FOR A HYBRID VEHICLE WITH AN AUTOMATIC TRANSMISSION

(75) Inventors: Tony T. Hoang, Warren, MI (US); Goro Tamai, Warren, MI (US); Robert Charles Downs, La Jolla, CA (US); Kenneth Robert Kridner, Holly, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/872,617

(22) Filed: Jun. 4, 2001

(65) Prior Publication Data

US 2002/0179047 A1 Dec. 5, 2002

(51) Int. Cl.⁷ .................................................. B60K 1/02
(52) U.S. Cl. .......................................... 477/3; 180/65.2
(58) Field of Search .............................. 477/3; 180/65.2

(56) References Cited

U.S. PATENT DOCUMENTS

| 5,558,175 A | * | 9/1996 | Sherman ..................... 180/65.2 |
| 5,823,282 A | * | 10/1998 | Yamaguchi ................. 180/65.2 |
| 6,077,186 A | * | 6/2000 | Kojima et al. .................. 477/3 |
| 6,469,402 B2 | * | 10/2002 | Morimoto et al. ........ 290/40 C |

\* cited by examiner

*Primary Examiner*—Dirk Wright
(74) *Attorney, Agent, or Firm*—Christopher DeVries (57) ABSTRACT

A method of controlling a powertrain for a hybrid vehicle, the method including providing an internal combustion engine, providing a motor generator operatively coupled to the internal combustion engine, providing an automatic transmission operatively coupled to the internal combustion engine, and actuating the motor generator to a certain speed to restart the vehicle.

21 Claims, 7 Drawing Sheets

TORQUE CONTROL SYSTEM FOR A HYBRID VEHICLE WITH AN AUTOMATIC TRANSMISSION

TECHNICAL FIELD

The present invention relates to a hybrid vehicle. More specifically, the present invention relates to a method and apparatus to provide a smooth transition between an electrical traction motor and internal combustion engine in a hybrid vehicle equipped with an automatic transmission.

BACKGROUND OF THE INVENTION

In today's automotive market, there exist a variety of propulsion or drive technologies used to power vehicles. The technologies include internal combustion engines (ICEs), electric drive systems utilizing batteries and/or fuel cells as an energy source, and hybrid systems utilizing a combination of internal combustion engines and electric drive systems. The propulsion systems each have specific technological, financial, and performance advantages and disadvantages, depending on the state of energy prices, energy infrastructure developments, environmental laws, and government incentives.

The increasing demand to improve fuel economy and reduce emissions in present vehicles has led to the development of advanced hybrid vehicles. Hybrid vehicles are classified as vehicles having at least two separate power sources, typically an internal combustion engine and an electric traction motor. Hybrid vehicles, as compared to standard vehicles driven by an ICE, can have improved fuel economy and reduced emissions. During varying driving conditions, hybrid vehicles will alternate between separate power sources, depending on the most efficient manner of operation of each power source. For example, a hybrid vehicle equipped with an ICE and an electric motor will shut down the ICE during a stopped or idle condition, allowing the electric motor to propel the vehicle and eventually restart the ICE, improving fuel economy for the hybrid vehicle.

Hybrid vehicles are broadly classified into series or parallel drivetrains, depending upon the configuration of the drivetrains. In a series drivetrain utilizing an ICE and an electric traction motor, only the electric motor drives the wheels of a vehicle. The ICE converts a fuel source to mechanical energy to turn a generator which converts the mechanical energy to electrical energy to drive the electric motor. In a parallel hybrid drivetrain system, two power sources such as an ICE and an electric traction motor operate in parallel to propel a vehicle. Generally, a hybrid vehicle having a parallel drivetrain combines the power and range advantages of a conventional ICE with the efficiency and electrical regeneration capability of an electric motor to increase fuel economy and lower emissions, as compared with a traditional ICE vehicle.

SUMMARY OF THE INVENTION

The present invention includes a vehicle having a parallel hybrid drive system incorporating an internal combustion engine (ICE), a conventional multi-speed automatic transmission and an electric motor generator (MoGen). The MoGen provides for propulsion of the vehicle during certain vehicle operating conditions, replaces an alternator to charge a battery pack in the vehicle, and replaces a conventional starter motor to start the ICE. The hybrid drive system of the present invention will utilize the ICE and MoGen to propel or motor the vehicle during the vehicle conditions which are most efficient for the ICE or MoGen operation. For example, during coasting, deceleration, and/or a stopped condition, fuel flow to the ICE will be cut off, as these conditions are some of the least efficient conditions to run the ICE. A fuel cut-off can be initiated by the application of a brake pedal, the release of a gas pedal or other similar indicators of a deceleration condition in the vehicle. The fuel cut-off function includes shutting off fuel, one cylinder at a time, to provide a smooth deceleration feel. Just before the cylinders are being shut off, an idle air control (IAC) motor or electronic throttle and the MoGen may be conditioned to help smooth the torque at the crankshaft of the ICE.

The MoGen system becomes the active propulsion or motoring system during this fuel cut-off feature and powers the vehicle without noticeably disturbing the operation of the vehicle or sacrificing driveability. The MoGen will propel the vehicle and smoothly transition the vehicle from the idle or stopped state and start the ICE for ICE driving conditions. The transfer of power between the MoGen and ICE, or vice versa, coupled to an automatic transmission should be transparent to the operator.

During normal operation of the vehicle when the ICE is running, the MoGen will act as an electrical generator to supply electrical power to the vehicle's electrical infrastructure (fans, radios, instrumentation, control, etc.) as well as recharging the battery pack. The battery pack and a power supply, such as a DC-DC converter, will supply power to the vehicle electrical infrastructure and power the MoGen when it is operating as the motoring device for the vehicle. In the motoring mode, the MoGen is an electrical load drawing current from the battery pack.

The control of the ICE and MoGen is executed using software routines that operate in conjunction with the normal operation of traditional powertrain and automatic transmission systems for powering a vehicle. In traditional powertrain systems during an ICE startup mode, the ICE is first driven by an electric motor starter and then supplied with fuel and spark. The automatic transmission is placed in a drive mode and the vehicle is accelerated by depressing an accelerator pedal for supplying more air and fuel to the ICE. When the vehicle is up to speed, a torque converter lock-up clutch in the automatic transmission is applied and the transmission is in a forward speed selection position such that the vehicle cruises under the power of the ICE.

When a conventional vehicle ICE is not running (0 rpm), the automatic transmission is not energized or primed [i.e., not ready to carry torque, as the transmission's clutch pack (e.g., for first gear) is not energized] because the transmission oil pump is not spinning. This situation will also occur when the transmission is either in the P ("Park") or N ("Neutral") position.

An electric starter is normally used to crank the engine crankshaft to a certain speed before spark and fuel are commanded to produce combustion (i.e., torque). To stabilize combustion, the IAC motor or electronic throttle is utilized to achieve the desired engine torque and speed. Once the transmission is shifted into the D ("Drive") position, a garage shift is performed to energize the transmission gear allowing the ICE to transfer torque to the wheels. As each event in this sequence occurs, a corresponding torque disturbance multiplication arises creating a decrease in the driveability of the vehicle. If a hybrid powertrain were to undergo this sequence after each fuel shut-off and start of the ICE, the driveability of the hybrid vehicle would be unacceptable.

The present invention incorporates a system and apparatus that controls the torque output of a hybrid powertrain system having a conventional automatic transmission to enable the hybrid vehicle to start and respond smoothly, emulating a conventional ICE powertrain.

DESCRIPTION OF THE PREFERRED EMBODIMENT

Figure 1:
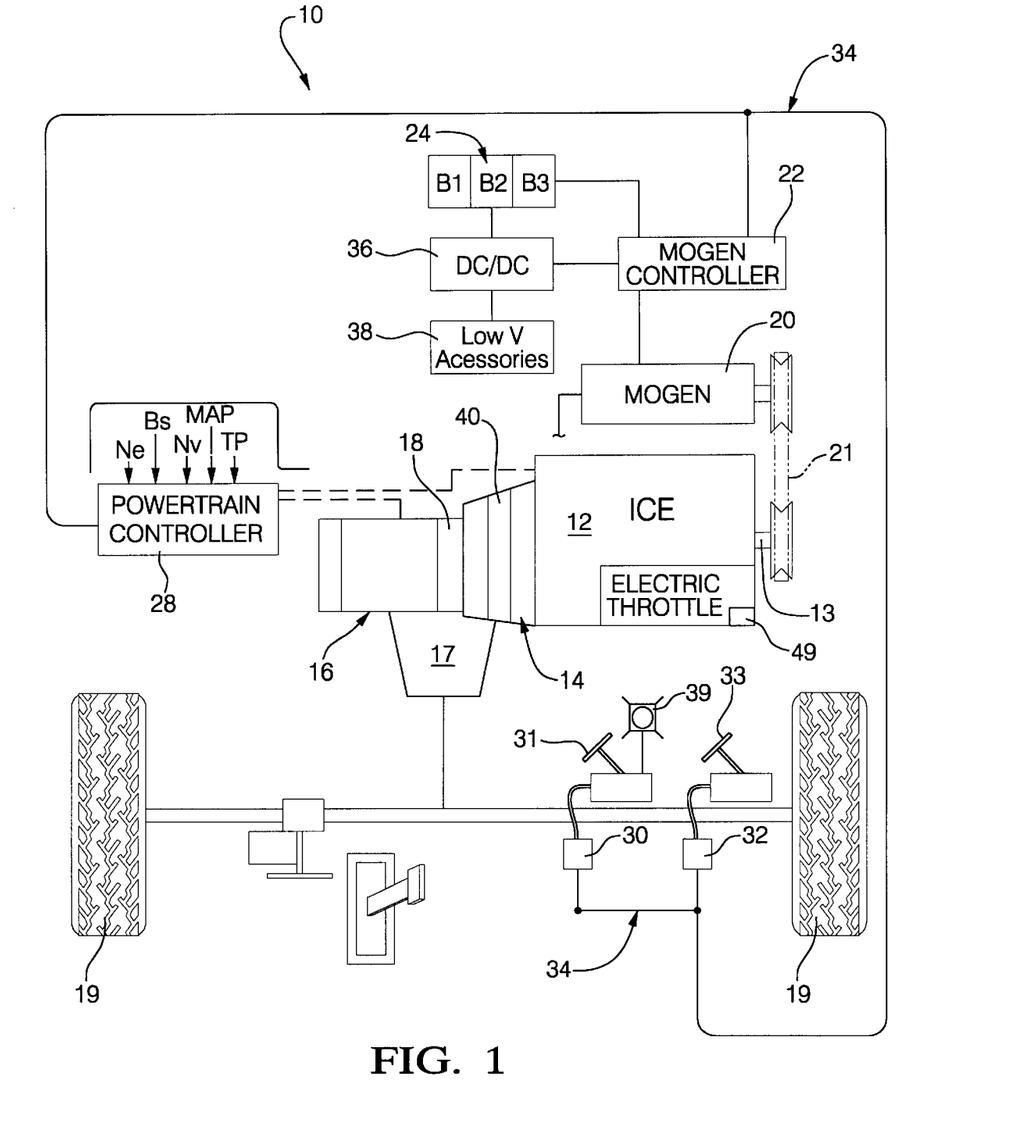
FIG. 1 is a diagrammatic drawing of a hybrid vehicle of the present invention.

FIG. 1 is a diagrammatic drawing of a hybrid vehicle system 10 of the present invention. The hybrid vehicle drive system 10 includes an internal combustion engine (ICE) 12, a torque converter 14 and a multi-speed automatic transmission 16 equipped with a transmission oil pump 18. The automatic transmission 16 drives a differential 17 coupled to the wheels 19 of the hybrid vehicle 10, as is known in the automotive art.

The hybrid vehicle drive system 10 further includes a motor generator (MoGen) 20 coupled to the ICE 12 by a belt drive 21 for providing a drive path to the crankshaft 13 of the ICE 12. The MoGen 20 is operatively associated with a MoGen controller 22 for selectively operating the MoGen 20 and to produce generated power for charging a battery pack 24 having batteries B1, B2 and B3. The MoGen 20 functions as either a motor to propel the vehicle 10 or a generator to charge the battery pack 24, depending on the operating state of the hybrid vehicle 10 (i.e., braking, stopped, or operating at a constant speed on a highway). The MoGen 20 is preferably an AC induction machine but may comprise any known electrical motor/generator technology, including, but not limited to, DC machines, synchronous machines, and switched reluctance machines. The batteries B1, B2, and B3 preferably comprise 12 Volt, valve-regulated absorbent glass Matt (AGM) lead-acid batteries connected in series to produce a 36 Volt nominal bus. In alternate embodiments of the present invention, the batteries B1, B2, and B3 may comprise any known battery technology, including, but not limited to, lithium polymer batteries and nickel metal hydride batteries.

A powertrain or engine controller 28 is associated with a brake pedal 31, a brake-pressure sensor (BPS) 30, a brake light switch (BLS) 39, an acceleration pedal 33, and an acceleration pedal sensor 32 that directs a signal to the MoGen controller 22 over an automotive communication network 34. In alternate embodiments of the present invention, the BPS 30 and/or acceleration pedal sensor 32 may be directly connected to the powertrain controller 28 or the MoGen controller 22.

A suitable DC-DC converter 36 is used to provide multiple voltage levels for driving the MoGen 20 in a motoring operation or charging the battery pack 24 in a regeneration operation. The DC-DC converter also conditions and directs electrical power from the MoGen 20 to a low voltage accessory system 38. The MoGen 20 in generator mode generates electrical energy that is transferred to the battery pack 24 via the DC-DC converter 36 by the MoGen controller 22. The MoGen controller 22 determines the direction of current flow for the MoGen 20 according to the vehicle operating state. In a regeneration state (such as during braking) or a charging condition, current will flow from the MoGen 20, via the MoGen controller 22, to charge the battery pack 24. In a state where the MoGen 20 is needed to provide propulsion, current will flow from the battery pack 24 to the MoGen 20, via the DC-DC converter 36 and the MoGen controller 22, to power the MoGen 20. In the present embodiment, the MoGen 20 operates at a nominal 36 volts.

Figure 2:
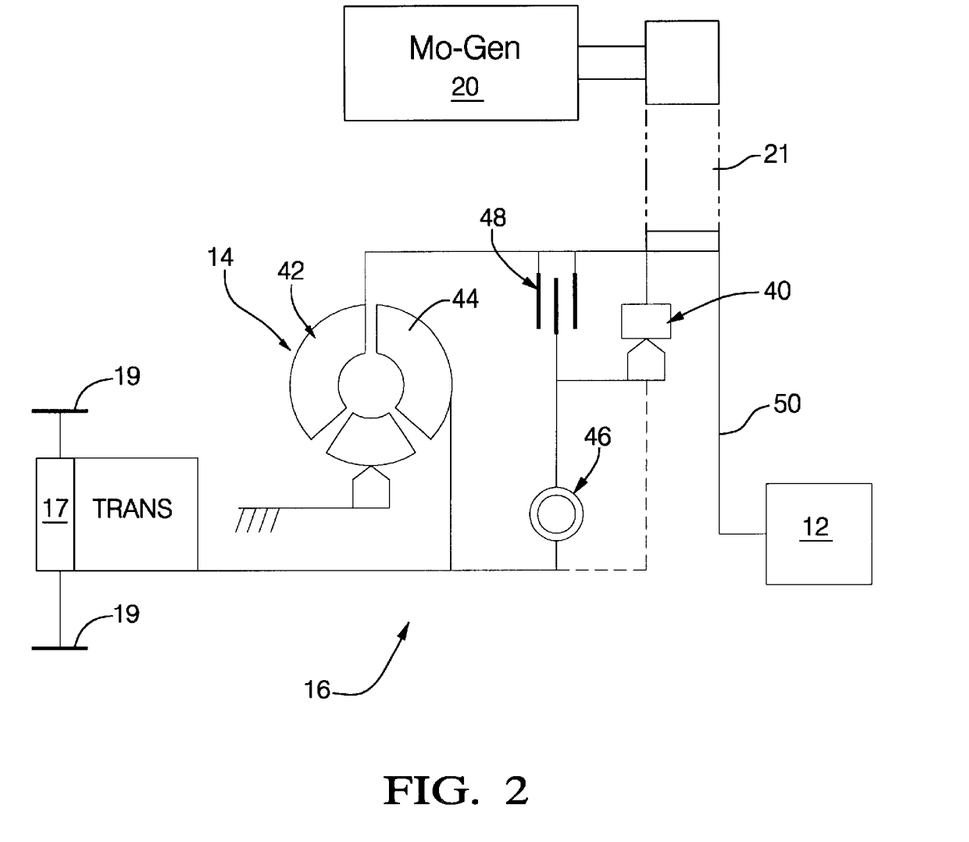
FIG. 2 is a line diagram of a torque converter and transmission for used in the hybrid vehicle of FIG. 1.

Referring to FIGS. 1 and 2, the transmission 16 of the present invention includes an over-speed locking and forward speed freewheeling one-way clutch assembly 40 operatively connected between the impeller or pump 42 of the torque converter 14 and a turbine 44 thereof. The transmission 16 further includes gear sets, clutches brakes operative to provide a plurality of drive speed ratios between the ICE 12 and a vehicle drive system such as the differential 17 and the wheels 19, as known in the automotive art. The vehicle drive system may be implemented as a front wheel or rear wheel drive system and may be modified to include various forms or power transfer to and from either front or rear drive wheels or both as desired. Multi-speed transmissions are well known in the art and a complete description is not required for purposes of understanding the configuration and operation of the present invention.

As shown diagrammatically in FIG. 2, the reverse lock, forward free wheel one-way clutch 40 is connected between the impeller 42 and the turbine 44 of the torque converter 14. Furthermore, in the preferred embodiment, the direct cross connection of the reverse lock, forward free wheel one-way clutch 40 can include a connection to the spring damper assembly 46 for a lock-up clutch 48. The preferred connection is shown in solid line in the diagrammatic illustration of FIG. 2 and the alternative direct connection is shown by a broken line designated by reference numeral 50. Accordingly, during direct forward drive by either using the MoGen 20 as a starting motor for the ICE 12 or during direct forward drive by the ICE 12, the one-way clutch 40 is operative to free wheel. However, because of the direct (or damper spring) connection between the impeller 42 and the turbine 44, the reverse lock, forward free wheel one-way clutch 40 will lock up during back drive from the transmission as in the case of vehicle deceleration or coasting while the gear selector is in a forward drive position so as to prevent engine speed droop or fall off.

As previously described, a torque disturbance may be caused by the ICE 12 mount reaction, ICE 12 compression pulsations, and the fluid coupling of the torque converter 14 of the automatic transmission 16 upon restarting the ICE 12 following a fuel cut-off to the ICE 12. The present invention utilizes a control system to modulate the MoGen 20 to spool the ICE 12 up to a desired speed, and to smoothly start the ICE 12 and vehicle while the transmission 16 is in gear. The control system of the present invention may be used to start the ICE 12 from a stop with the transmission 14 in gear (such as launching a vehicle from a stop light) and start the ICE 12 while coasting (or braking) with the ICE 12 stalled (i.e., the vehicle speed would be below the drop-neutral-speed).

The methods of the present invention control the torque of the ICE 12 from a fuel cut-off state to smoothly start the ICE 12 and vehicle 10 from a stop with no throttle pedal application. A throttle position sensor (TPS) 49 indicates the position of a throttle plate controlled by an IAC motor or electronic throttle 47 coupled to the ICE 12. A closed throttle plate is indicated by a TPS 49 value of zero. The TPS 49 may comprise an encoder, potentiometer, or any other position sensing device. For a vehicle with a conventional cable-actuated throttle plate, the TPS 49 can also be used as a measure of accelerator pedal 33 position.

The method of the present invention allows the vehicle 10 to gently creep forward from a stopped condition similar to a conventional vehicle with a conventional powertrain. In the hybrid powertrain of the present invention, with the fuel cut off to the ICE 12, the vehicle 10 can be started by releasing the brake pedal 31 up to a critical BPS 30 value, or by releasing the brake pedal up to the deactivation of the BLS 39, depending on the driving condition. The BPS 30 is preferably a pressure sensor installed in line with one of the brake fluid lines to measure the amount of force applied to the brake pedal and may comprise any pressure sensor known in the art including, but not limited to, strain gauges and diaphragm sensors. A brake pedal position sensor such as a potentiometer or encoder may also be used to indicate the extent of brake application.

At the end of a deceleration operation by the ICE 12 and vehicle 10 and before a restart, the crankshaft 13 of the ICE 12 can be rotated to a desired angular position. To start rotating the crankshaft 13, the MoGen 20 torque is set to a "Pre-Release Preload" value that is activated when the MoGen controller 22 reads a predetermined brake release rate as the sensed BPS 30 value approaches a critical BPS 30 value (or BLS 39 signal) required for a start of the ICE 12. This Pre-Release Preload value is calculated to barely rotate the crankshaft 13 of the ICE 12. This rotation may be forward or backward to position the crankshaft 13 in the desired position. Once the critical BPS 30 value (or BLS 39 signal) is reached, the MoGen 20 torque is set to an "Initial Preload" value, which is a torque command to "break the ICE 12 loose" from static friction in the ICE 12. If, after a calibrated time, the minimum crankshaft 13 rotation has not been realized, the preload torque is increased until the desired crankshaft 13 rotation is detected. The crankshaft 13 rotation angle can be detected by any standard crank speed sensor or target wheel. The preload torque is activated and stepped up until a predetermined crankshaft 13 rotation angle is detected, at which time the MoGen 20 power is reduced and a proportional-integral-derivative (PID) speed control algorithm in the powertrain controller 28 takes control of the ICE 12 speed.

In the preferred embodiment of the present invention, the crankshaft 13 is coupled to a target wheel having six equally-spaced notches and an asymmetric notch to reference the top dead center (TDC) of at least one cylinder in the ICE 12. A speed sensor detects the notches on the target wheel to transfer a pulse train to the powertrain controller 28 to provide speed and position information to the powertrain controller 28. Once the ICE 12 is spinning, the powertrain controller 28 interfaces with the MoGen controller 22, via the automotive communications network 24, to regulate the ICE 12 speed profile to reach a desired target speed. The speed profile is steep enough that compression bobble is not objectionable and gentle enough to prevent any disturbances via the powertrain mounts and through the torque converter 14.

An alternative method of reaching the target speed for the ICE 12 along a prescribed speed profile is for the powertrain controller 28 to send a target-speed command to the MoGen controller 22. The MoGen controller 22 will perform the ICE 12 spooling without the interference from the powertrain controller 28 performing closed-loop speed control on the ICE 12.

The methods of the present invention include two engine starting control methods or algorithms that can be used to launch the vehicle 10. Both methods strive to minimize torque disturbance such as bumps and surges by controlling the ICE 12 speed profile as smoothly as possible by preventing discontinuities in acceleration profile. The methods used for the two systems are identical except for the ICE 12 speed at which the MoGen 20 motoring power is phased out while fueling is initiated.

Figure 3:
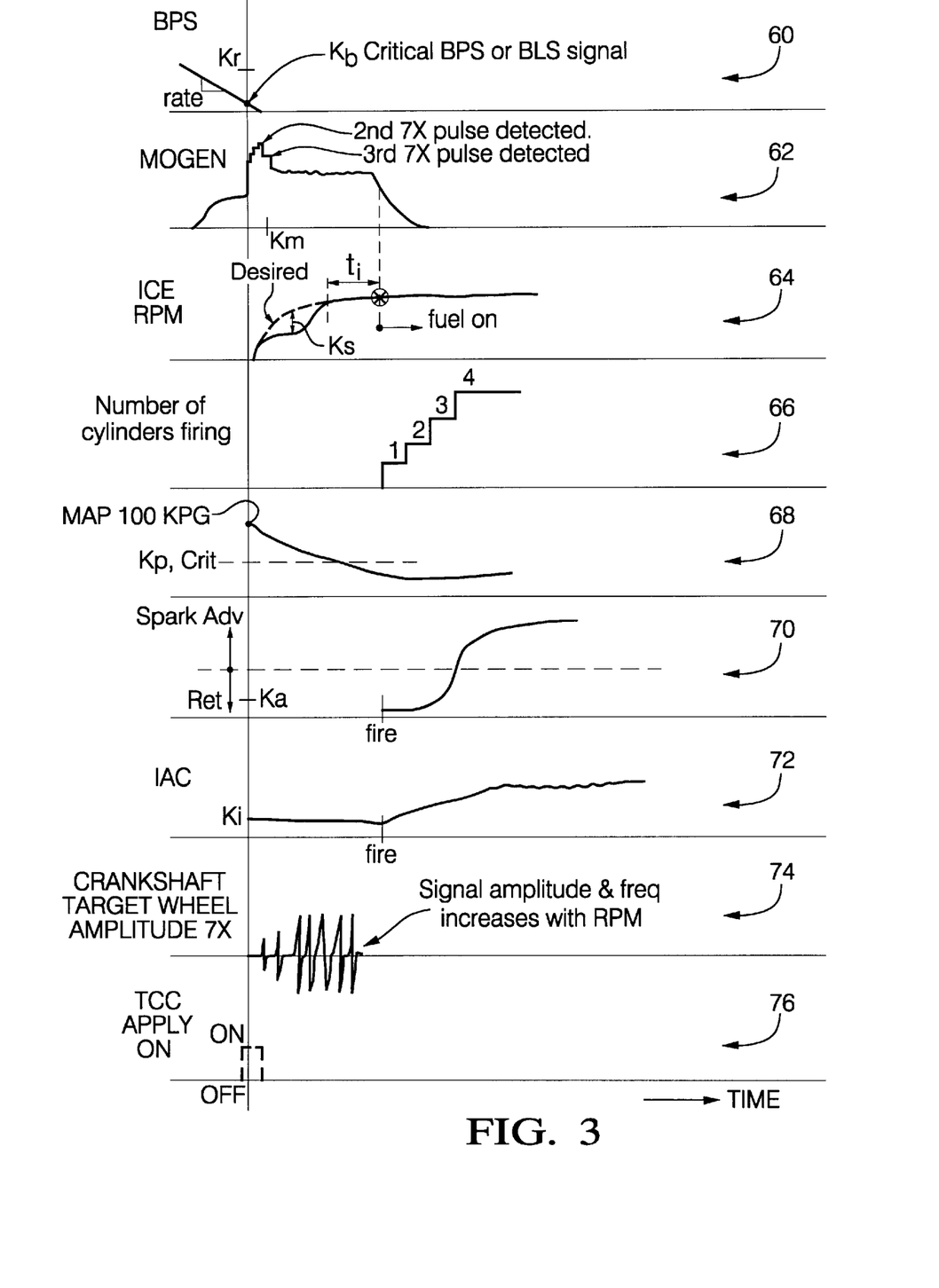
FIG. 3 is series of plots illustrating a control method of the present invention.
Figure 4:
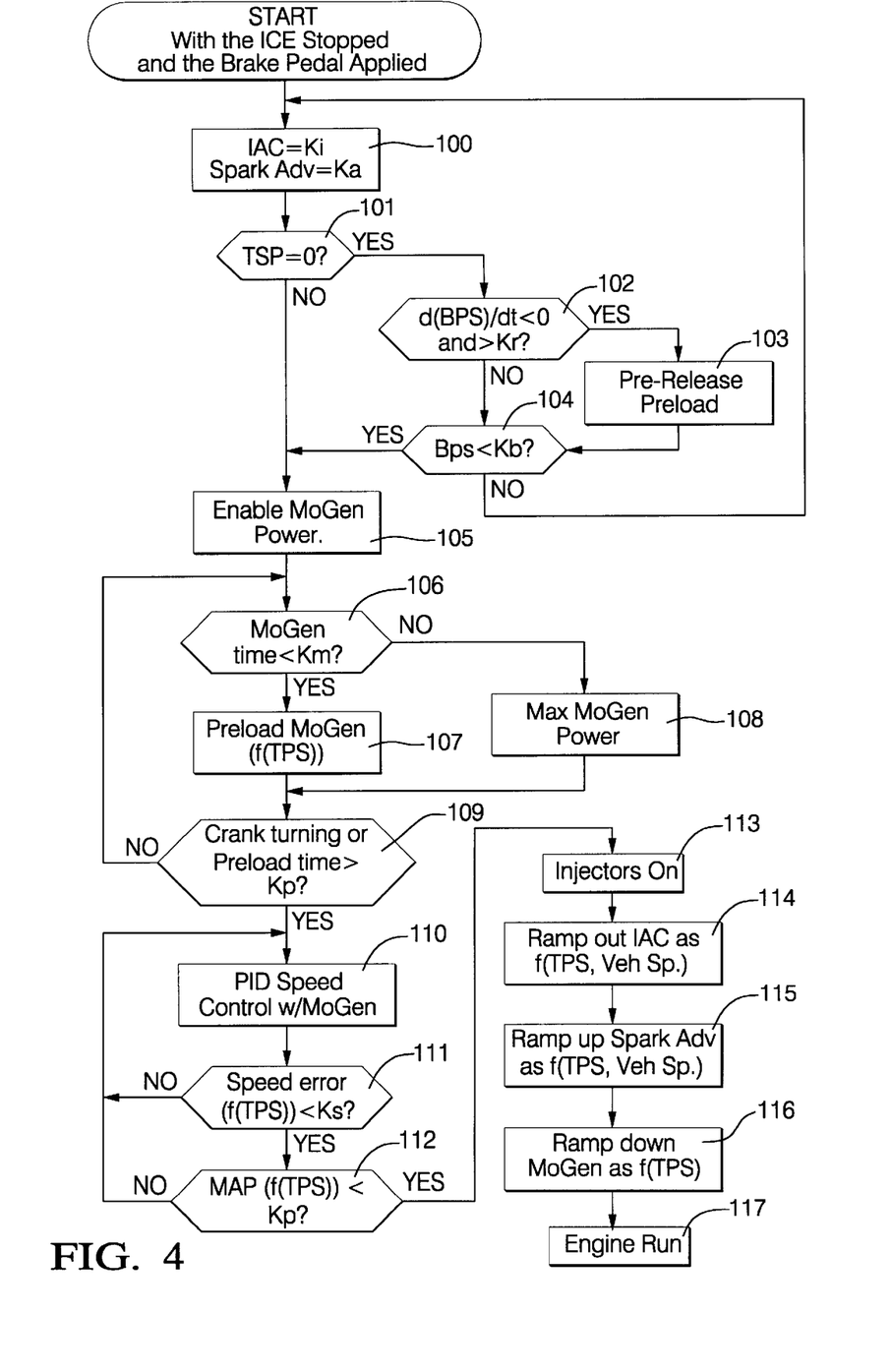
FIG. 4 is a flow chart of a control method of the present invention.

FIGS. 3 and 4 illustrate the first control method of the present invention for torque control from a stop condition for the vehicle 10, called "Electric Creep". FIG. 3 includes diagrammatic drawings of a BPS plot 60, a MoGen torque plot 62, an ICE RPM plot 64, a cylinder firing plot 66, a manifold air pressure (MAP) plot 68, a spark advance/retard plot 70, an idle air control (IAC) plot 72, a plot 74 of the crankshaft target wheel amplitude and frequency, and a torque converter clutch (TCC) state plot 76 all versus time. In alternate embodiments of the present invention, the critical BPS value for some low speed driving conditions can be replaced by the brake light switch (BLS) 39 signal.

Referring to FIG. 3 and the flowcharts of FIGS. 4A–B, the Electric Creep method starts with the engine stalled with the brake pedal 31 applied. At Block 100, IAC is set equal to Ki and spark advance is set equal to Ka. For reference, all Kx values are calibration values determined empirically to be stored in the MoGen controller 22 and the powertrain controller 28 and are shown in FIGS. 3 and 5. Continuing to Block 101, the method determines if the position of the throttle plate is closed (TPS=0), as indicated by TPS 49. If the throttle plate is closed, then the brake pressure change rate as measured by the brake pressure sensor 30 is compared to 0 and Kr (d(BPS)/dt<0 and >Kr at Block 102. If d(BPS)/dt <0 and >Kr, then the method continues to Block 103 where the MoGen 20 torque is set to the Pre-release Preload value and continues to Block 104. If d(BPS)/dt is not <0 and >Kr, then the method also continues to Block 104. Block 104 determines if the BPS<Kb. If the BPS value is not <Kb, the routine returns to Block 100. If the BPS value is <Kb, then MoGen power is enabled at Block 105. Block 106 determines if the MoGen time <Km. If the MoGen time is not <Km, then the method continues to Block 108 where the MoGen power is set to a max to ensure engine crank rotation. The more aggressively the driver applies the accelerator pedal 33 (high TPS 49 value and TPS 49 rate), the more MoGen 20 power is commanded to accelerate the ICE 12.

At Block 107, the preload value for the MoGen is determined as a function of TPS. At Block 109 the method determines if the crankshaft 13 is turning. If the crankshaft 13 is not turning, then the method will return to Block 106. If the crankshaft 13 is turning, then the method continues to Block 110 where the powertrain controller 28 will control the speed of the ICE 12 with a PID control algorithm in conjunction with the MoGen 20 and MoGen controller 22. At Block 111, if the speed error, which is a function of throttle position, is less than Ks, then the routine continues to Block 112. If the speed error is greater than or equal to Ks, then the method returns to Block 110. At Block 112, if the MAP, whose desired value is a function of TPS, is not <Kp, then the method returns to Block 110. If the MAP is less than Kp, then the method continues to 113. At Block 113 the injectors of the ICE 12 are fired as shown by the cylinder firing plot 66 in FIG. 3 (a method for a four cylinder ICE is illustrated). Continuing to Block 114, the IAC or electronic throttle motor 47 is moved to allow more air into the ICE 12 as shown by the IAC plot 72. At Block 115, spark advance is ramped up as shown by the spark plot 70 of FIG. 3. At Block 116 the MoGen 20 torque is ramped down as shown by the MoGen torque plot 62 of FIG. 3. A control loop can be implemented to control the MoGen 20 torque, IAC, and spark to maintain the desired engine speed profile. The ICE 12 is then set to run normally at Block 117.

Referring to FIG. 3, the MoGen 20 ramps the ICE 12 speed up to a controlled target speed plateau (preferably 600 rpm or ~idle speed for some time $t_i$) and then phases in fuel and spark. The torque converter clutch (TCC) can be mildly pulsed to reduce gear rattle. The MoGen 20 power is quickly withdrawn with minimal torque disturbance (i.e., minimal engine speed fluctuation). Before any combustion commences, the vehicle is actually being crept forward using the MoGen 20. At the start of the transition between pure electric and pure combustion operation, the spark is in full retard, the throttle plate or IAC is open a minimal amount, and MAP is monitored. In the present application using sequential port fuel injection, the fuel injector to each cylinder of the ICE 12 is turned on successively while in full spark retard. When commencing combustion, spark advance is controlled at a negative value (retard) until all the fuel injectors are on. The fuel injectors are turned on sequentially while the combustion torque contribution from the IAC or electronic throttle motor 47 is incrementally added (proportional to the number of firing cylinders). Thus, by the time all the injectors are on, the IAC motor 47 is at the optimum position to maintain engine torque without stalling. As the ICE 12 power builds cylinder by cylinder, the MoGen 20 power is ramped down to maintain a steady idle speed, and spark advance is ramped up as a function of the value of the TPS 49. The MoGen 20 can be conditioned to run as a generator, further reducing engine speed flare.

As each cylinder fires, the IAC or electronic throttle motor 47 is adjusted accordingly to deliver a smooth predictable torque increase. With a system with individual cylinder spark control (and possibly with variable valve actuation), the cylinders can the turned on at a more staggered timing for finer torque control.

Fuel and spark are delivered only after the MAP is reduced to a predetermined lower pressure (e.g., 40 kPa) because starting combustion at high MAP (e.g., 80+ kPa) can result in a large torque disturbance which would be felt as a jolt by the operator. As the MoGen 20 torque is being decreased, the amount of spark advance and IAC is increased such that the net torque at the crankshaft 13 is constant as the system transitions to pure combustion power.

If at any time during this transition the operator steps on the accelerator pedal (TPS>0), the gentle blending of the MoGen 20 and combustion power is aborted, and spark advance and MoGen 20 power can be combined to deliver the requested power. Both the TPS 49 value and its rate of increase are monitored. As the TPS 49 value is increased, the spark-retard pullout rate is increased, and as the TPS 49 value application rate is increased beyond a certain threshold, a gain is added to the spark-retard pullout rate. Also, the MoGen 20 can apply "Inertia Elimination" torque to liven the powertrain response. The MoGen 20 applies extra power to the ICE 12 during aggressive driving conditions to help accelerate the extra MoGen 20 hardware added to the base powertrain. If the throttle application occurs before firing has commenced, a certain amount of spark retard is exercised for the first few engine cycles before the aforementioned sparkretard pullout control system is initiated. Firing the first combustion event on an open throttle can lead to a large torque pulse that could be objectionable to the operator. An alternative (or addition) to spark retard in this condition is to implement an electronic throttle control system (ETC) in which the throttle can be controlled independently of the operator-imposed pedal position sensor (PPS) value. In this ETC case, the powertrain controller 28 can set the throttle position to be low, even at high PPS values, so that the initial rotation of the ICE 12 by the MoGen 20 can be smoother.

Figure 5:
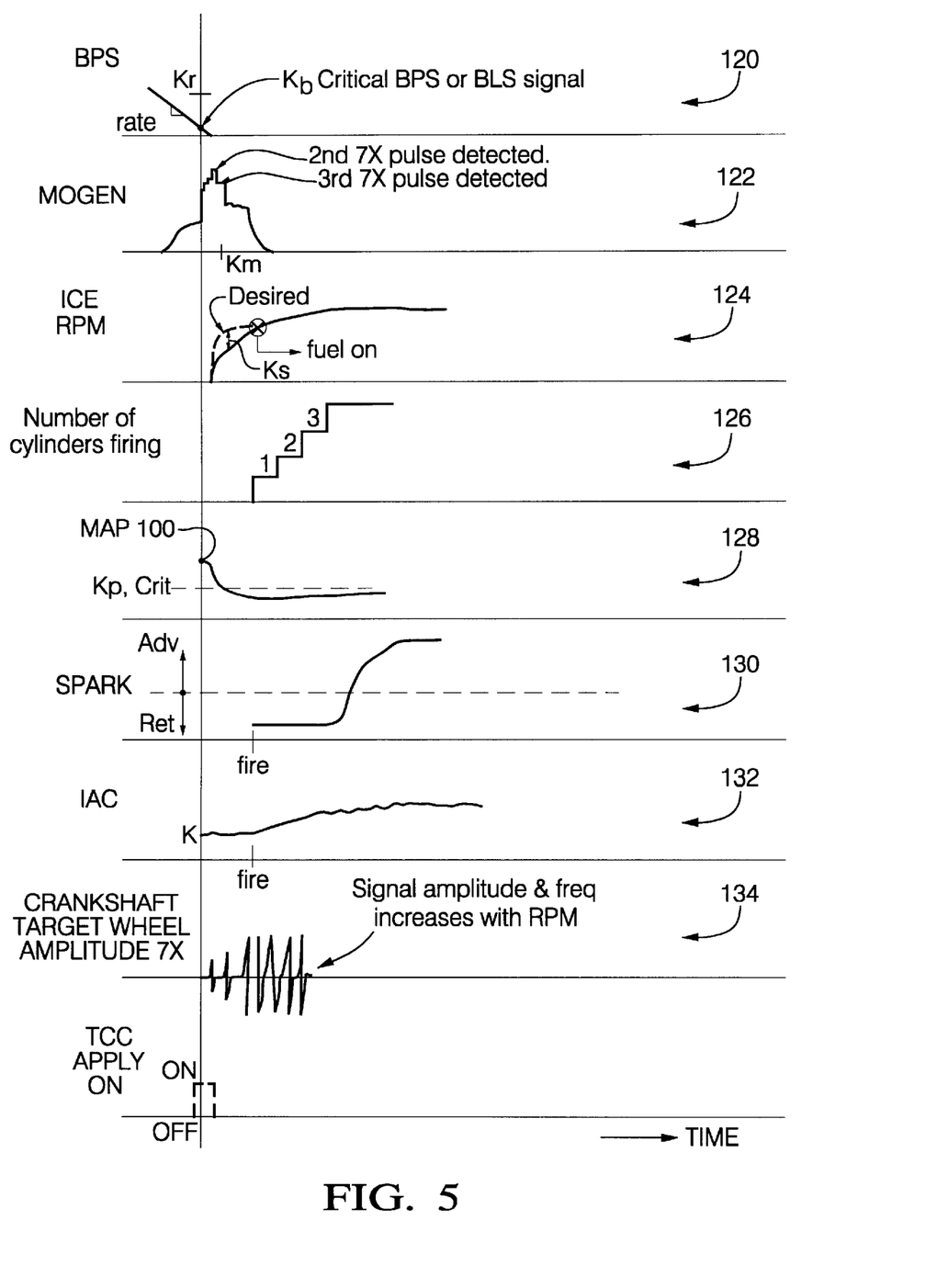
FIG. 5 is a series of plots illustrating a control method of the present invention.

FIG. 5 illustrates the second control algorithm of the present invention for torque control from a stop condition for the vehicle 10, called "Non-Electric Creep," and can also be referenced to FIG. 4 since the only difference between the Electric Creep method and the Non-Electric Creep method is the ICE 12 speed at which the fueling is initiated. FIG. 5 includes diagrammatic drawings of a BPS plot 120, a MoGen torque plot 122, an ICE RPM plot 124, a cylinder firing plot 126, a manifold air pressure (MAP) plot 128, a spark advance/retard plot 130, an IAC plot 132, a plot 134 of the crankshaft 13 target wheel amplitude and frequency, and a TCC state plot 134 all versus time. Again, similar to FIG. 3, the critical BPS value for some low speed driving conditions can be replaced by the brake light switch (BLS) 39 signal.

The Non-Electric Creep method uses the MoGen 20 to commence ICE 12 rotation but lets the combustion power of the ICE 12 raise the ICE 12 speed up to the target speed plateau. The Non-Electric Creep method is potentially less draining to the battery pack 24 and heats the MoGen 20 system less because the MoGen 20 motoring power and the motoring time are reduced. The Electric Creep and Non-Electric Creep controls are identical up to the Non-Electric Creep system's MoGen ramp-out speed (e.g., 400 rpm) where the fuel and spark are first introduced. Once fuel flow is initiated, the spark retard and IAC are managed via closed-loop control on ICE 12 speed. Similar to the Electric Creep system, the engine speed profile is controlled to quickly rise to the target speed with minimal disturbances in the speed profile and minimal overshoot (critically damped). If after the MoGen 20 motoring power is off (or during its descent) the ICE 12 speed starts to droop uncharacteristically, the MoGen 20 motoring power can be dynamically reapplied to stabilize the ICE 12 speed.

Once the ICE 12 is spinning, the MoGen 20 torque/combustion torque blending system is identical to those mentioned for the first Electric Creep method. The non-electric creep method is used when the ICE 12 is stalled when the vehicle is rolling and restarted via brake release. Thus, if no throttle is applied (TPS=0) after the brake release event, the powertrain controller 28 will control the ICE 12 speed to idle (~650 rpm). Therefore, even if after a very aggressive braking event with the ICE 12 stalled, the operator does not wish to accelerate aggressively, there is no torque disturbance since the MoGen 20 ICE 12 start (with TPS=0) would bring the ICE 12 only to idle speed. If the vehicle speed is greater than what it would be if the vehicle were propelled by the ICE 12 at idle speed, the forward freewheel of the first gear would be freewheeling, and thus no torque is transmitted to the road. For very low or zero speeds, the release of the brake pedal 31 commands the MoGen 20 to respin the ICE 12 at a different power calibration as compared to at higher speeds. The critical speed is a function of first gear ratio.

Determination and partitioning of the brake pedal 31 pressure using the BPS 30 is important to the application of the Electric and Non-Electric Creep methods, since the release of the brake pedal 31 will initiate the methods of the present invention. For illustration purposes, assume the BPS 30 sensed value can be scaled from 0 (foot off brake) to a maximum of 100 counts. The maximum value to which the operator monotonically depresses the brake is the BPS max value. In the preferred embodiment, a small BPS max value (e.g., 1–33 counts) can be given a BPS max index of 1, and a large BPS max value (e.g., 66–100 counts) can be given a BPS max index of 3.

The brake pedal 31 release rate as measured by the BPS 30 (in units of counts/sec) is given an index of 1 to 3, where 3 is the most aggressive application. A BPS release rate of 0–50 counts/sec can be given an index of 1, and a BPS release rate of 250+counts/sec can be given an index of 3. This index is used to let the powertrain controller 28 determine how aggressively the operator is braking, and thus gives some indication that the operator may be just as aggressive on the following throttle application.

The product of the two BPS indices is the net BPS index. The critical BPS value for ICE 12 restart is calculated by multiplying the net BPS index by x % points of the BPS max value. For example, if the operator strongly applies the brakes (e.g., BPS max=87) and quickly releases the brake (e.g., 255 counts/sec), resulting in a BPS max index of 3, and a BPS rate index of 3, the net BPS index would be 3*3=9. For x=1, the critical BPS value would then by 9*1=9% points of the max BPS value. Thus, when the operator is letting off the brake pedal 31, the ICE 12 would restart when the brake pedal 31 is released only up to 8 counts (9%*87). An alternative way of interpreting this 9% is that the ICE 12 is restarted if the brake pedal 31 is released 91% (100%-9%).

In another example, if the operator barely taps the brake pedal 31 slowly, the net BPS index would be 1, and the ICE 12 would be restarted when the brake pedal 31 is release 99%, which is essentially fully released.

The above example is simplified for illustrative purposes. In the preferred embodiment, linear interpolations are performed between the indices to provide more progressive and predictable responses.

The present control system that determines the critical BPS 30 value needed since the ICE 12 restart takes a finite amount of time (e.g., 0.2 seconds to spool up the ICE from 0 rpm to 600 rpm). For responsiveness comparable to a non-hybrid powertrain, it is important that the ICE 12 be firing by the time the operator's foot switches from the brake pedal 31 to the accelerator pedal 33. For two-footed operators, since the throttle is generally programmed to have higher authority than the brake pedal 31, the ICE 12 will restart if the operator steps into the throttle while still on the brake pedal 31.

Figure 6:
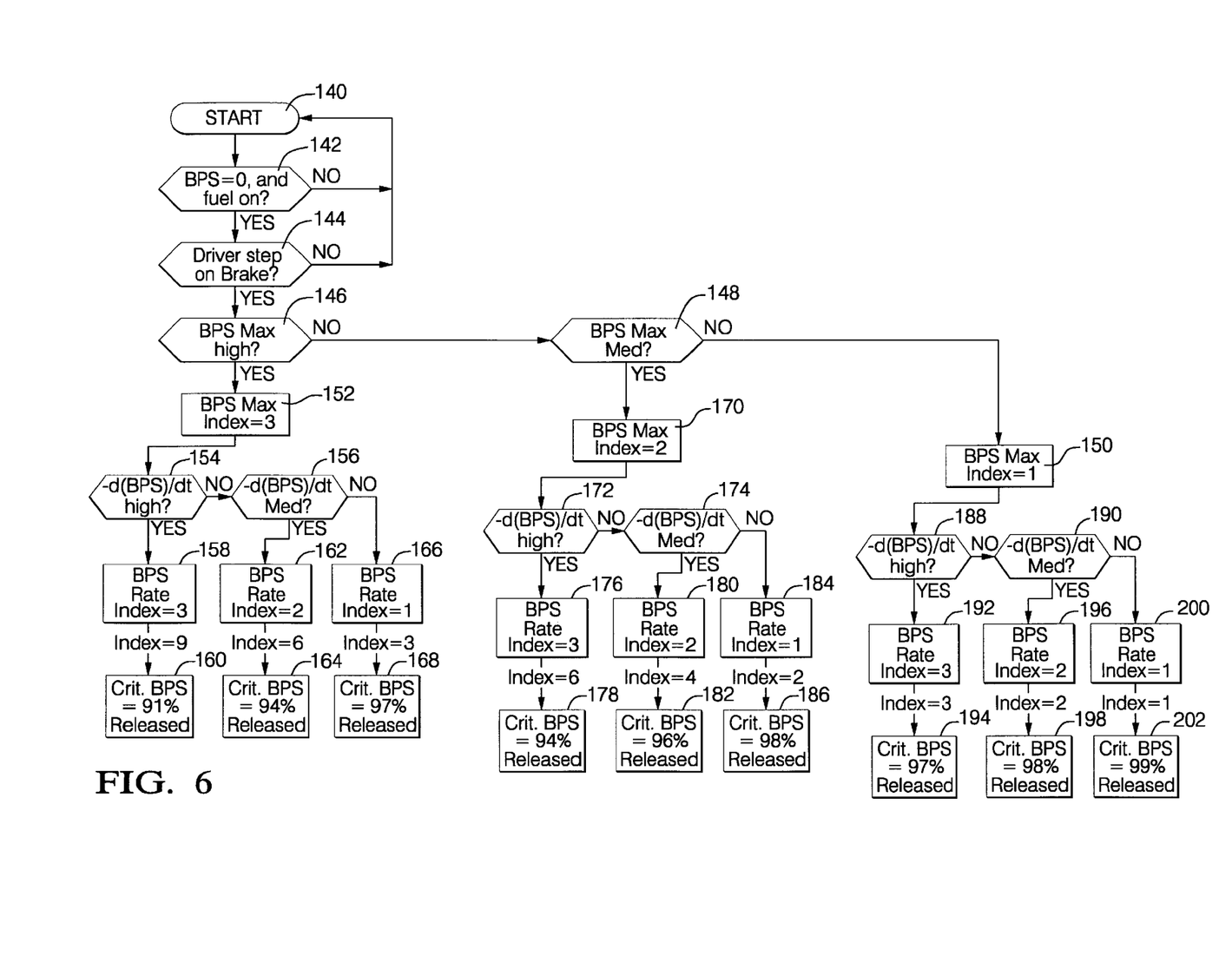
FIG. 6 is a flowchart of a control method of the present invention.

Referring to the flowchart of FIG. 6, the preferred method for determining a critical BPS 30 value is illustrated. The method starts at Block 140 and continues to Block 142 where the method determines if the BPS 30 value is equal to zero and the fuel is on. If the BPS 30 value is not equal to zero and the fuel is not on, then the method returns to Block 140. If the BPS 30 value does equal 0 and the fuel is on, then the method continues to Block 144 to determine if the operator has stepped on the brake pedal 31. If the operator has not stepped on the brake pedal 31, then the method returns to Block 140. If the operator has stepped on the brake pedal 31, then the method continues to Block 146 to determine if the BPS Max value is high. (If the BPS Max value is not high, then the method continues to Block 148 to determine if the BPS Max value is medium.)

Returning to Block 146, if the BPS Max value is high then the method continues to Block 152 and sets the BPS Max Index to 3. At Block 154, the method determines if the BPS Rate (d(BPS)/dt) is high. If the BPS Rate is not high, then the routine continues to Block 156 to determine if the BPS Rate is medium. Returning to Block 154, if the BPS Rate is high, then the BPS Rate Index is set equal to 3 at block 158 for a Net BPS Index of 9. At Block 160, the Critical BPS=91% is determined, such that the ICE 12 restart routine is initiated when the brake pedal 31 is released 91% of the BPS Max value.

Returning to Block 156, if the BPS Rate is medium, then the BPS 30 Rate Index is set equal to 2 at Block 162 and the Net BPS Index=3*2=6. At Block 164 the Critical BPS=94% is such that the ICE 12 restart routine is initiated when the brake pedal 31 is released 94% of the BPS Max value. If the BPS value is not medium, then the BPS Max Index is set equal to 1 at block 166 and the Net BPS Index=3*1=3. At Block 168 the Critical BPS=97% is such that the ICE 12 restart routine is initiated when the brake pedal 31 is released 97% of the BPS Max value.

Returning to Block 148, if the BPS Max value is medium, then the BPS Max Index is set equal to 2 at Block 170. At Block 172, the method determines if the BPS Rate (d(BPS)/dt) is high. If the BPS Rate is not high, then the routine continues to Block 174 to determine if the BPS Rate is medium. Returning to Block 72, if the BPS Rate is high, then the BPS Rate Index is set equal to 3 at Block 176 and the Net BPS Index=2*3=6. At Block 178 the Critical BPS=94% is such that the ICE 12 restart routine is initiated when the brake is released 94% of the BPS Max value.

Returning to Block 174, if the BPS Rate is medium, then the BPS Rate Index is set equal to 2 at Block 180 and the Net BPS Index=2*2=4. At Block 182, the Critical BPS=96% is such that the ICE 12 restart routine is initiated when the brake pedal 31 is released 91% of the BPS Max value. If the BPS value is not medium, then the BPS Max Index is set equal to 1 at Block 184 and the Net BPS Index=2 and at Block 186 the Critical BPS=98% is such that the ICE 12 restart routine is initiated when the brake is released 98% of the BPS Max value.

Returning to Block 148, if the BPS Max value is not medium, then the BPS Max Index is set equal to 1 at Block 150. At Block 188, the method determines if the BPS Rate (d(BPS)/dt) is high. If the BPS Rate is not high, then the routine continues to Block 190 to determine if the BPS Rate is medium. Returning to Block 188, if the BPS Rate is high, then the BPS Rate Index is set equal to 3 at Block 192 and the Net BPS Index=1*3=3. At Block 194, the Critical BPS=97% is such that the ICE 12 restart routine is initiated when the brake pedal 31 is released 97% of the BPS Max value.

Returning to Block 190, if the BPS Rate is medium, then the BPS Rate Index is set equal to 2 at Block 196 and the Net BPS Index=1*2=2. At Block 198, the Critical BPS=98% is such that the ICE 12 restart routine is initiated when the brake is released 98% of the BPS max value.

If the BPS value is not medium, then the BPS Max Index is set equal to 1 at Block 200 and the Net BPS Index=1*1=1. At Block 202, the Critical BPS=99% is such that the ICE restart routine is initiated when the brake is released 99% of the BPS max value. The BPS indexes will determine the operation of the electric and nonelectric creep methods of the present invention.

Figure 7:
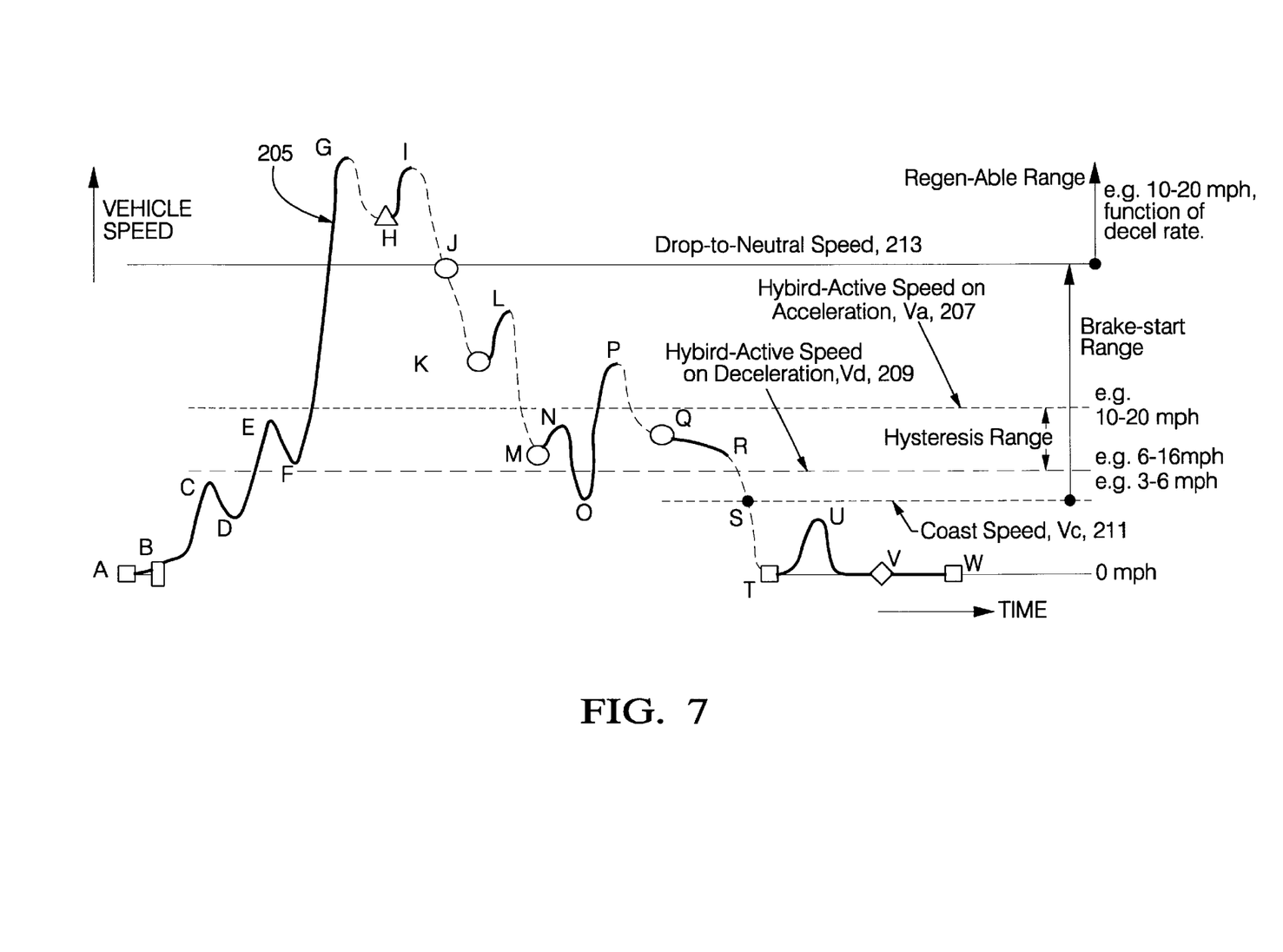
FIG. 7 is a graph illustrating a fuel control sequence of the present invention as a function of vehicle speed.

A schematic of a fuel control sequence as a function of vehicle speed is shown in FIG. 7. FIG. 7 illustrates a hysteresis speed range that includes a hybrid-active speed initiation range on acceleration Va shown on broken line at 207 (e.g., a range of 10 to 20 mph). A hybrid-active speed on decelerationVd at speed range (e.g., 6 to 16 mph) is shown by a broken line 209 in FIG. 7. A Coast speed Vc at speed range (e.g., 3 to 6 mph) is shown by a broken line 211 in FIG. 7. The control sequence in FIG. 7 also includes a brake start speed range that it is between 3 mph and the Drop-to-Neutral speed (shown by 213 in FIG. 7).

A graphic representation of the control modes of the present invention is shown in FIG. 7 as including representative points on a vehicle speed time curve designated by reference numeral 205. At the beginning of the representatively-illustrated schematic, the vehicle speed is zero at point 205A on the curve 205. At this point the vehicle is at rest and the fuel is off. When the brake pedal 31 is released, the MoGen 20 will be conditioned by the MoGen controller 28 to draw electrical energy from the battery pack 24 so as to cause the ICE 12 to turn and thus drive the crankshaft 13 and the connected drive train components including the torque converter clutch 14 and the multi-speed transmission 16 through a creep speed range shown between points 205A and 205B. Accordingly, this operation can be initiated by merely releasing the brake pedal 31. From points 205B–205C, 205C–205D, 205D–205E, 205E–205F, 205F–205G, the fuel supply is on.

From points 205G–205H, the fuel is cut off and the vehicle is in a regenerative braking mode. At point 205H, the ICE 12 is started by delivering fuel and spark to the ICE 12. This can be facilitated by the tip into the accelerator pedal 33 by the vehicle operator. However, the MoGen 20 can be used if the ICE 12 RPM is lower than optimal. From points 205H–205I, the fuel supply is on. From points 205I–205J, the fuel is off and the vehicle is a regenerative mode, with the ICE 12 driven by the reverse freewheeler torque converter 14. If the brake pedal 31 is released at any point between 205I and 205J, and the vehicle continues to decelerate with the fuel cut off and no other pedals are applied, the fuel and spark will be delivered just before the drop-to-neutral speed is reached in order to refuel the ICE 12 with possible assist from the MoGen 20.

At point 205J, the transmission 16 drops to effectively neutral by dropping to first gear and coasting off the first-clutch overrunning clutch. From points 205J–205K, the fuel is cut off and the vehicle is coasting with the ICE 12 stalled. At point 205K, the ICE 12 can be started upon brake pedal 31 release. The BPS 30 value threshold for start is x % of BPS Max, x is a function of BPS Max and BPS rate.

From points 205L–205M, the fuel is cut off and the vehicle is coasting (ICE 12 stalled). At point 205M, the ICE 12 is started with the MoGen 20 upon brake pedal 31 release. The fuel is also on from points 205M–205N, 205N–205O and 205O–205P. From points 205P–205Q, the fuel is cut off and the vehicle is coasting with the ICE 12 stalled.

As the vehicle decelerates from point 205P to point 205Q, the ICE 12 can be started with the MoGen 20 upon the brake pedal 31 release. From points 205Q–205R, the fuel is on; however, there is no application of the acceleration pedal 33 and the vehicle continues to decelerate. At point 205R, the fuel to the ICE 12 is cut off upon brake pedal 31 application since the vehicle speed during the deceleration is above Vd. From points 205R–205S–205T, the fuel is cut off and the ICE 12 is stalled. Between point 205S and point 205T. The ICE 12 is restarted with the MoGen 20 upon brake pedal 31 release, but with a different power calibration as compared to points 205M and 205Q. Above the coast speed $V_c$, when the ICE 12 is respun to idle speed, the vehicle continues to "coast" because the first gear's over-running clutch prevents torque transmission to the axles. Thus, the MoGen 20 power can be applied aggressively. However, below $V_c$ the control for the zero vehicle speed start is used to minimize engine speed overshoot.

At point 205T, the vehicle is stopped with the fuel cut off and upon immediate application of the accelerator pedal 33, with or without the release of the brake pedal 31, the ICE 12 is turned electrically and the ICE 12 is fired. Accordingly, from points 205T–205U and 205U–205V, the fuel is on.

At point 205V, the vehicle is at a stop, and at this point the bottoming out of the brake pedal 31, as indicated by BPS 30, will cause the fuel supply to be shut off. From points 205V–205W, the fuel is cut-off and the vehicle is stopped.

While this invention has been described in terms of some specific embodiments, it will be appreciated that other forms can readily be adapted by one skilled in the art. Accordingly, the scope of this invention is to be considered limited only by the following claims.

What is claimed is:

1. A method of controlling a powertrain for a hybrid vehicle, the method comprising:

providing an internal combustion engine;

providing a motor generator operatively coupled to said internal combustion engine;

providing an automatic transmission operatively coupled to said internal combustion engine; and actuating said motor generator to a certain speed to prime said automatic transmission.

2. The method of claim 1 further comprising the step of starting said internal combustion engine after said automatic transmission is primed.

3. The method of claim 1 further comprising the step of determining the position of a throttle plate in a throttle body.

4. The method of claim 1 further comprising the step of determining the position of an accelerator pedal.

5. The method of claim 1 further comprising the step of determining a brake pedal actuation using brake pressure.

6. The method of claim 5 further comprising the steps of:

decelerating the vehicle to a drop-to-neutral speed by placing said automatic transmission in a low gear;

maintaining a coasting condition by freewheeling said automatic transmission;

decelerating under said coasting condition; and restarting said internal combustion engine using said motor generator when said accelerator pedal is depressed or said brake pedal is released.

7. The method of claim 1 further comprising the steps of:

starting said internal combustion engine; and controlling the torque of said internal combustion engine to blend with the torque of said motor-generator, whereby driveability of the hybrid vehicle is controlled.

8. The method of claim 1 wherein the step of controlling the torque of said internal combustion engine to blend with the torque of said motor generator comprises:

monitoring a throttle position for said internal combustion engine;

monitoring an accelerator pedal position;

monitoring brake pressure;

controlling fuel injectors;

controlling spark advance and retard;

controlling said throttle position; and controlling torque converter clutch application.

9. The method of claim 8 further comprising the step of monitoring a brake light switch.

10. The method of claim 1 wherein said step of priming said automatic transmission comprises actuating a torque converter coupled to said automatic transmission to allow the transfer of torque through said torque converter to said automatic transmission.

11. A hybrid vehicle powertrain system comprising:
an internal combustion engine having a crankshaft;
an automatic transmission having a torque converter coupled to said crankshaft;
a motor generator coupled to said crankshaft;
a throttle position sensor for detecting the position of a throttle plate operatively coupled to said internal combustion engine;
a pedal position sensor for detecting the position of an accelerator pedal located within the hybrid vehicle;
a manifold pressure sensor located in said internal combustion engine; and
at least one controller for controlling said internal combustion engine and said motor-generator, said controller including software to control said motor-generator to actuate said torque converter.

12. The hybrid vehicle powertrain system of claim 10 wherein said controller is electrically coupled to said throttle position sensor, said pedal position sensor, and said manifold pressure sensor.

13. The hybrid vehicle powertrain system of claim 11 wherein said software in said controller controls said motor generator and said internal combustion engine with respect to said throttle position sensor, said pedal position sensor, and said manifold pressure sensor.

14. The hybrid vehicle powertrain system of claim 11 wherein said throttle plate is actuated by an electric motor.

15. The hybrid vehicle powertrain system of claim 11 further comprising:
a motor-generator controller controlling said motor generator; and
an engine controller for controlling said internal combustion engine.

16. A method of starting a hybrid vehicle equipped with an automatic transmission, the method comprising:
providing an internal combustion engine in the hybrid vehicle;
providing a motor generator coupled to said internal combustion engine;
providing an automatic transmission having a torque converter coupled to said internal combustion engine;
actuating said internal combustion engine by actuating said motor generator, whereby said torque converter is actuated and primed; and
starting said internal combustion engine.

17. The method of claim 15 further comprising the step of measuring a brake release value to determine when to actuate said motor generator.

18. The method of claim 15 wherein the step of actuating said internal combustion engine by actuating said motor generator comprises generating a torque command to said motor generator sufficient to break said internal combustion engine loose from friction.

19. The method of claim 15 further comprising the step of measuring the speed of a crankshaft of said internal combustion engine.

20. The method of claim 15 wherein the step of starting said internal combustion method comprises phasing in fuel and spark control for said internal combustion engine as torque for said motor generator is reduced.

21. The method of claim 15 wherein the step of starting said internal combustion method comprises:
measuring the manifold pressure of said internal combustion engine;
measuring the position of an accelerator pedal;
measuring the position of a throttle plate operatively coupled to said internal combustion engine;
controlling said throttle plate position at impending engine crankshaft rotation;
measuring the speed of said internal combustion engine;
sequentially firing fuel injectors in response to a measured engine speed;
controlling spark retard as a function of measured manifold pressure; and
controlling said throttle plate position as a function of the firing of said fuel injectors.

* * * * *